(12) United States Patent
Guo et al.

(10) Patent No.: US 9,872,311 B2
(45) Date of Patent: Jan. 16, 2018

(54) METHOD, BASE STATION, AND TERMINAL FOR NOTIFYING AND RECEIVING DOWNLINK DEMODULATION PILOT FREQUENCY CONTROL SIGNALING

(71) Applicant: ZTE CORPORATION, Shenzhen, Guangdong Province (CN)

(72) Inventors: Senbao Guo, Shenzhen (CN); Yunfeng Sun, Shenzhen (CN); Junfeng Zhang, Shenzhen (CN); Dongli Chen, Shenzhen (CN); Wenfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 689 days.

(21) Appl. No.: 14/648,922

(22) PCT Filed: Dec. 21, 2012

(86) PCT No.: PCT/CN2012/087134
§ 371 (c)(1),
(2) Date: Jun. 2, 2015

(87) PCT Pub. No.: WO2013/107244
PCT Pub. Date: Jul. 25, 2013

(65) Prior Publication Data
US 2015/0341958 A1 Nov. 26, 2015

(30) Foreign Application Priority Data
Jan. 20, 2012 (CN) .......................... 2012 1 0019000

(51) Int. Cl.
*H04W 72/12* (2009.01)
*H04W 72/04* (2009.01)
(Continued)

(52) U.S. Cl.
CPC ....... *H04W 72/1294* (2013.01); *H04L 1/0038* (2013.01); *H04L 5/0051* (2013.01);
(Continued)

(58) Field of Classification Search
CPC ............ H04W 72/1294; H04W 72/042; H04L 1/0038; H04L 5/0051; H04L 5/0053; H04L 5/0073
See application file for complete search history.

(56) References Cited

U.S. PATENT DOCUMENTS

2006/0291377 A1 12/2006 Imaizumi
2010/0311349 A1* 12/2010 Koo ...................... H04W 16/02
455/67.11
(Continued)

FOREIGN PATENT DOCUMENTS

CN 101162986 A 4/2008
CN 101309523 A 11/2008
(Continued)

*Primary Examiner* — Latresa McCallum
(74) *Attorney, Agent, or Firm* — Ling Wu; Stephen Yang; Ling and Yang Intellectual Property (57) ABSTRACT

A method for notifying a downlink demodulation pilot control signaling, includes: a base station side notifying a user equipment (UE) side of an index of a virtual signaling group and/or index of port offset signaling group used when generating a downlink pilot sequence and/or mapping the generated downlink pilot sequence through at least one of the following information: UE-specific or common high layer signaling; antenna indication information of DL_Grant; new data indication information in a Disable TB signaling in the DL_Grant; scrambling indication information in the DL_Grant; in a UE-specific or common search space, an aggregation level of the DL_Grant, a relative position of a first control channel element of the DL_Grant in the UE-specific or common search space, a subframe
(Continued)

number where the DL_Grant is located and a system frame number where the DL_Grant is located.

19 Claims, 1 Drawing Sheet (51) Int. Cl.
  *H04L 1/00* (2006.01)
  *H04L 5/00* (2006.01)
(52) U.S. Cl.
  CPC .......... *H04L 5/0053* (2013.01); *H04L 5/0073* (2013.01); *H04W 72/042* (2013.01)

(56) References Cited

U.S. PATENT DOCUMENTS

| | | | | |
|---|---|---|---|---|
| 2011/0019776 | A1* | 1/2011 | Zhang | H04L 5/0023 375/340 |
| 2011/0103241 | A1* | 5/2011 | Cho | H04L 5/0007 370/252 |
| 2011/0103324 | A1* | 5/2011 | Nam | H04L 5/0048 370/329 |
| 2011/0235599 | A1* | 9/2011 | Nam | H04L 1/0027 370/329 |
| 2011/0243066 | A1* | 10/2011 | Nayeb Nazar | H04L 1/007 370/328 |
| 2011/0269459 | A1* | 11/2011 | Koo | H04W 24/10 455/434 |
| 2012/0057562 | A1* | 3/2012 | Kim | H04B 7/0452 370/329 |

FOREIGN PATENT DOCUMENTS

| | | |
|---|---|---|
| CN | 101483916 A | 7/2009 |
| CN | 102158981 A | 8/2011 |
| WO | 2011157237 A1 | 12/2011 |

* cited by examiner

METHOD, BASE STATION, AND TERMINAL FOR NOTIFYING AND RECEIVING DOWNLINK DEMODULATION PILOT FREQUENCY CONTROL SIGNALING

TECHNICAL FIELD

The present document relates to the field of communications, and more particularly, to a method for notifying and receiving a downlink demodulation pilot control signaling, as well as a base station and a terminal.

BACKGROUND OF THE INVENTION

On the basis of the two versions R8 and R9, the version R10 of the Long Term Evolution (LTE) system adds many new features, for example, pilot characteristics such as DMRS (Demodulation Reference Signal) and CSI-RS (Channel State Information Reference Signal), and transmission and feedback characteristics such as eight antenna supporting, especially the eICIC (enhanced Inter-Cell Interference Cancelling) technology, which further considers the inter-cell interference cancelling technology on the basis of considering the R8/9 ICIC.

Technologies for solving the problem of inter-cell interference mainly consider avoiding inter-cell interference in a homogeneous network at the early stage of the R10, wherein the mainstream considerations are the eICIC technology and the CoMP (Coordinated Multi-point) technology. The CoMP, as the name suggests, is multiple nodes coordinating to send data to one or more user equipments (UE) in the same or different time-frequency resources. Such technologies can reduce inter-cell interference, increase throughput at the cell edge, and expand the cell coverage. However, since discussions at the later stage take the heterogeneous network into consideration and introduce more scenarios, and also due to the complexity of CoMP technology and the limited time for R10 discussion, it was finally determined that no extra CoMP standardized content would be introduced at the R10 stage, but the needs of CoMP part can be considered when designing the CSI-RS, therefore there has been no further discussion on the CoMP technology after the 60bis conference.

The LTE defines that the PDCCH (Physical downlink control channel) bears scheduling and allocating and other control information, and each PDCCH is composed of a plurality of CCEs (Control Channel Elements), and the number of CCEs of each subframe is determined by the number of PDCCHs and the downlink bandwidth.

The UE obtains the PDCCH by performing a blind detection in the search space. The search space is divided into a common search space and a UE-specific search space; the common search space refers to a region which all UE can search, and this space carries the cell specific information; the specific search space is a space range which an individual UE can search, and the specific search spaces of a plurality of UEs are likely to overlap, but generally the initial search positions are not the same. Before the blind detection, a high layer signaling is used to notify the UE of working mode and the type of Radio Network Temporary Identity (RNTI) used for cyclic redundancy check (CRC) scrambling of the PDCCH.

The relationship between the search space $S_k^{(L)}$ and the aggregation level L as well as the number of candidate PDCCHs $M^{(L)}$ is shown in Table 1. The aggregation level is the number of CCEs occupied by the PDCCH. When a blind detection is performed in the UE-specific search space, the UE first calculates the initial position $Y_k$ of the blind detection according to the user identity (UE ID) and the subframe number, and then performs detection in the search space until the PDCCH assigned to itself is detected.

TABLE 2

PDCCH candidate set

| Type | Search space $_k^{(L)}$ | | The number of candidate PDCCHs $M^{(L)}$ |
|---|---|---|---|
| | Aggregation level L | Size [the number of CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The correspondence of the aggregation level and the relative positions of the first control channel element of PDCCH in the UE-specific search space is shown in Table 2.

The relative position of the first control channel element of PDCCH in the UE-specific search space refers to the relative position of the first CCE index nCCE occupied by the PDCCH to the initial position $Y_k$ of the blind detection, and it is indicated as nCCE, offset in this specification, nCCE, offset=nCCE−$Y_k$, and the value range of nCCE, offset is 0~6, 8, 10.

TABLE 2

Correspondence of the aggregation level and the first CCE position

| Aggregation level | The relative position of the first CCE in the UE-specific search space |
|---|---|
| L = 1 | nCCE, offset = 0/2/4/1/3/5 |
| L = 2 | nCCE, offset = 0/4/8/10 |
| L = 3 | nCCE, offset = 0/4 |
| L = 4 | nCCE, offset = 0/8 |

In the SI (Study Item) stage of the R11, the main consideration is in Scenario4, and since different nodes have the same cell ID, if at this time the TM8 or TM9 is used for data transmission, the conventional DMRS sequence initialization expression is:

$$c_{init}=(\lfloor n_s/2 \rfloor+1)\cdot(2N_{ID}^{cell}+1)\cdot 2^{16}+n_{SCID} \qquad \text{eq. (1)}$$

As can be seen from this equation that, the DMRS sequence is only related to time slot index ($n_s$), cell ID ($N_{ID}^{cell}$), and scrambling sequence indication identity $n_{SCID}$, taking into account that respective nodes in the same cell are fully synchronized, and $n_{SCID}$, can only take the value of 0 or 1, and when the UEs of different nodes use the same sequence to send the DMRS, it will lead to strong DMRS interference between different nodes, which would limit the cell splitting gain under the Scenario4. Therefore, it considers introducing new parameters to make different nodes have different DMRS, which randomizes DMRS interferences between different nodes, thereby further obtaining the cell splitting gain under the Scenario4.

Then considering the Scenario3, since different nodes have different Cell IDs, if there is a UE located at the edge of two nodes, considering that the UE can perform multi-user multiple input multiple output (MU-MIMO) transmission with any UE in these two nodes, in order to ensure the orthogonality between two UEs, it needs to equip the edge UE with a $N_{ID}^{cell}$ notification, especially when the edge UE is a UE which is currently performing the DPS (Dynamic Point Selection).

In the method for notifying the virtual ID, one consideration is to use a high layer signaling to notify the UE of the set of multiple virtual IDs, then $n_{SCID}$ is used to indicate that it is which virtual ID in the set of multiple virtual IDs, wherein each virtual ID may be referred to as a set of virtual signalings.

Furthermore, when considering that the UE transmits in two layers, because it needs to ensure the transparency of the MU-MIMO to the UE, the DMRS maximally supports the orthogonality of two DRMS ports, that is, in order to ensure a full orthogonality, it requires that the maximum number of layers of the UE of two MU-MIMO is two. Therefore, for a two-layer transmission, it can mainly focus on the effect of randomization, but for a one-layer transmission, it can mainly focus on the effect of orthogonality. Considering the effect of randomization, there are technologies proposing the following expression:

$$c_{init}=(\lfloor n_s/2 \rfloor+1)\cdot(2X+1)\cdot 2^{16}+Y \qquad \text{Eq. (2)}$$

Wherein X indicates the virtual ID, Y indicates the virtual scrambling indication information, X and Y can be indicated via a common dynamic or semi-static signaling. In this method, X and Y can be called as representing a set of virtual signalings.

Considering that in order to avoid the interference between demodulation pilots of different nodes in the heterogeneous network scenario, it can consider ensuring the DMRS orthogonality of different nodes, and the orthogonality of four users is maximally supported, then the flexible allocation of ports can be used to achieve this objective.

SUMMARY OF THE INVENTION

The embodiment of the present invention is to provide a method for indicating pilot control signaling, to make better use of pilot to achieve effects of orthogonality and interference randomization, thereby enhancing the accuracy of channel estimation and increasing the capacity of system.

To solve the abovementioned technical problem, the embodiment of the present invention provides a method for notifying downlink demodulation pilot control signaling, comprising: a base station side notifying a user equipment (UE) side of an index of a virtual signaling group and/or an index of a port offset signaling group used when the base station side generates a downlink pilot sequence and/or maps the generated downlink pilot sequence through at least one of the following information:

a UE-specific or common high layer signaling;
antenna indication information of a downlink grant control information (DL_Grant);
new data indication information in a disable transport block (TB) signaling in the DL_Grant;
scrambling indication information in the DL_Grant;
an aggregation level of the DL_Grant in a UE-specific or common search space;
a relative position, in the UE-specific or common search space, of a first control channel element of the DL_Grant in the UE-specific or common search space;
a subframe number where the DL_Grant is located in the UE-specific or common search space; and
a system frame number where the DL_Grant is located in the UE-specific or common search space.

The DL_Grant format comprises:
at least one of downlink control information format (DCI format) 1, DCI format1a, DCI format1b, DCI format1c, DCI format1d, DCI format2, DCI format2a, DCI format2b, DCI format2c and versions after R10.

The antenna indication information in the DL_Grant comprises:
related information of the antenna port indication in the DL_Grant with at least one of the DCI format 2b, DCI format2c and versions after R10.

The new data indication information in the disable TB signaling in the DL_Grant comprises:
related information of new data indication (NDI) in the DL_Grant with at least one of the DCI format2b, DCI format2c and versions after R10.

The aggregation level of the DL_Grant in the UE-specific or common search space comprises:
at least one of aggregation levels in the search space of the DL_Grant with at least one of the downlink control information format (DCI format) 1, the DCI format1a, the DCI format1b, the DCI format1c, the DCI format1d, the DCI format2, the DCI format2a, the DCI format2b, the DCI format2c and versions after the R10.

The subframe where the DL_Grant is located in the UE-specific or common search space comprises:
at least one of subframes where the DL_Grant with at least one of the downlink control information format (DCI format) 1, the DCI format1a, the DCI format1b, the DCI format1c, the DCI format1d, the DCI format2, the DCI format2a, the DCI format2b, the DCI format2c and versions after R10 is located.

A virtual signaling parameter set in the virtual signaling group comprises one or more virtual identities (ID) and/or virtual scrambling indication information.

The port offset signaling group comprises a plurality of port offset signalings;
the method further comprises: the base station side notifying the UE side to be in a certain mode through a high layer signaling, and in the mode, a high layer or physical layer port offset signaling needing to be used to indicate the number of offset ports relative to offset port 7, offset port 8, offset port 9 or offset port 10.

The port offset signaling group comprises a plurality of port offset signalings;
the method further comprises: a base station side first notifying the UE side to be in a mode through a physical layer signaling, and in the mode, a high-layer or physical-layer port offset signaling needing to be used to indicate the number of offset ports relative to the offset port 7, the offset port 8, the offset port 9 or the offset port 10.

The port offset signaling group comprises a plurality of port offset signalings;
the method further comprises: a base station side first notifying the UE side to be in a mode through at least one of the following information, and in the mode, a port offset signaling needing to be used to indicate the number of offset ports relative to the offset port 7, the offset port 8, the offset port 9 or the offset port 10; this information comprises:
antenna indication information of a DL_Grant;
new data indication information in a disable transport block (TB) signaling in the DL_Grant;
scrambling indication information in the DL_Grant;
an aggregation level of the DL_Grant in a UE-specific or common search space;
a relative position, in the UE-specific or common search space, of a first control channel element of the DL_Grant in the UE-specific or common search space;

a subframe number where the DL_Grant is located in the UE-specific or common search space; and a system frame number where the DL_Grant is located in the UE-specific or common search space; and a UE-specific high layer signaling.

The method for using a port offset signaling to indicate the number of offset ports relative to the offset port 7, the offset port 8, the offset port 9 or the offset port 10 comprises:

using a high-layer signaling, a physical layer signaling, or at least one of the following information:

the antenna indication information of the DL_Grant;

the new data indication information in the disable transport block (TB) signaling in the DL_Grant;

the scrambling indication information in the DL_Grant;

the aggregation level of the DL_Grant in the UE-specific or common search space;

the relative position, in the UE-specific or common search space, of the first control channel element of the DL_Grant in the UE-specific or common search space;

the subframe number where the DL_Grant is located in the UE-specific or common search space; and the system frame number where the DL_Grant is located in the UE-specific or common search space.

Indicating the number of offset ports relative to the offset port 7, the offset port 8, the offset port 9 or the offset port 10 comprises indicating at least one value in {0,2,4,5,6,7}.

The embodiment of the present invention further provides a method for receiving downlink demodulation pilot control signaling, comprising:

receiving a notification from a base station side according to the method of any one of claims 1 to 12, performing a blind detection on at least one of the following information, and obtaining indication information in a downlink grant control information (DL_Grant):

a UE-specific or common high layer signaling;

antenna indication information of downlink grant control information (DL_Grant);

new data indication information in a disable transport block (TB) signaling in the DL_Grant;

scrambling indication information in the DL_Grant;

an aggregation level of the DL_Grant in a UE-specific or common search space;

a relative position, in the UE-specific or common search space, of a first control channel element of the DL_Grant in the UE-specific or common search space;

a subframe number where the DL_Grant is located in the UE-specific or common search space; and a system frame number where the DL_Grant is located in the UE-specific or common search space;

and obtaining an index of a virtual signaling group and/or an index of a port offset signaling group used when the base station side generates a downlink pilot sequence and/or maps the generated downlink pilot sequence according to the indication information in the DL_Grant obtained through the blind detection.

The embodiment of the present invention further provides a base station, comprising a generating and mapping module and a notifying module, wherein:

the generating and mapping module is configured to generate a downlink pilot sequence and/or map a generated downlink pilot sequence;

the notifying module is configured to, according to the method of any one of claims 1 to 12, notify the user equipment (UE) side of the index of a virtual signaling group and/or index of a port offset signaling group used when the base station side generates a downlink pilot sequence and/or maps a generated downlink pilot sequence through at least one of the following information:

a UE-specific or common high layer signaling;

antenna indication information of a downlink grant control information (DL_Grant);

new data indication information in a disable transport block (TB) signaling in the DL_Grant;

scrambling indication information in the DL_Grant;

an aggregation level of the DL_Grant in a UE-specific or common search space;

a relative position, in the UE-specific or common search space, of a first control channel element of the DL_Grant in the UE-specific or common search space;

a subframe number where the DL_Grant is located in the UE-specific or common search space; and a system frame number where the DL_Grant is located in the UE-specific or common search space.

The embodiment of the present invention further provides a user equipment, comprising a detecting module and a selecting module, wherein:

the detecting module is configured to receive a notification from an base station side according to the method of any one of claims 1 to 12, and obtain indication information in a downlink grant control information (DL_Grant) by performing a blind detection on at least one of the following information:

a UE-specific or common high layer signaling;

antenna indication information of a downlink grant control information (DL_Grant);

new data indication information in a disable transport block (TB) signaling in the DL_Grant;

scrambling indication information in the DL_Grant;

an aggregation level of the DL_Grant in a UE-specific or common search space;

a relative position, in the UE-specific or common search space, of a first control channel element of the DL_Grant in the UE-specific or common search space;

a subframe number where the DL_Grant is located in the UE-specific or common search space; and a system frame number where the DL_Grant is located in the UE-specific or common search space;

the selecting module is configured to obtain the index of a virtual signaling group and/or index of a port offset signaling group used when the base station side generates a downlink pilot sequence and/or maps the generated downlink pilot sequence according to the indication information in the DL_Grant obtained by the detecting module.

Compared with the related art, in the method for enhancing and indicating pilot control signaling provided in the embodiment of the present invention, the base station side and the user equipment side can standardize at least one of the following information to notify the index of the virtual signaling group used by the UE, to indicate the parameters of the pilot control signaling, such that the base station side and the user equipment side come to an agreement, so as to make better use of the pilot to achieve the effects of orthogonality and interference randomization, and enhance the accuracy of channel estimation and increase the capacity of system.

The abovementioned information comprises:

(1) UE-specific high layer signaling;

(2) antenna indication information in the DL_Grant;

(3) new data indication information in a disable transport block (TB) signaling in the DL_Grant;

(4) an aggregation level of the DL_Grant in a UE-specific or common search space;

(5) a relative position, in the UE-specific or common search space, of a first control channel element of the DL_Grant in the UE-specific or common search space;

(6) a subframe number where the DL_Grant is located in the UE-specific or common search space; and (7) a system frame number where the DL_Grant is located in the UE-specific or common search space;

Other features and advantages of the present document will be set forth in the following specification, moreover, part of them will be apparent from the specification, or be learned by implementing the present document. The objectives and other advantages of the present document can be realized and obtained through the structure particularly pointed out in the specification, the claims, as well as the accompanying drawings.

BRIEF DESCRIPTION OF THE DRAWINGS

The accompanying figures are used to provide a further understanding of the technical scheme of the present document and constitute a part of the specification, and serve to explain the technical scheme of the present document together with the embodiments of the present invention, but they are not construed as limiting the technical scheme of the present document.

PREFERRED EMBODIMENTS OF THE INVENTION

Hereinafter in conjunction with the accompanying drawings and the embodiments, the embodiments of the present invention will be described in detail, whereby the implementation process of how the present document applies the technical means to solve the technical problem and achieve the technical effect can be fully understood and implemented accordingly.

First, any combinations of embodiments of the present invention and various features in the embodiments are within the protection scope of the present document at the premise of no conflict. Furthermore, the steps illustrated in the flow chart in the accompanying drawing may be executed in a computer system in which a group of computer-executable instructions can be implemented, and although a logical order is shown in the flow chart, in some cases, the shown or described steps may be performed in a different order.

In the method for notifying a downlink demodulation pilot control signaling in an embodiment of the present invention, a base station side notifies the UE side of the index of a virtual signaling group and/or index of a port offset signaling group used when the base station side generates a downlink pilot sequence and/or maps the generated downlink pilot sequence (map it to the time-frequency resources) through at least one of the following information.

The virtual signaling or the virtual signaling group or the virtual signaling set in the present document is only to represent the name of this signaling, and actually it can also be called as a signaling or a signaling group or a signaling set.

The abovementioned information comprises:

(1) UE-specific or common high layer signaling;

(2) antenna indication information of a downlink grant control information (DL_Grant);

(3) new data indication information in a disable transport block (TB) signaling in the DL_Grant;

(4) scrambling indication information in the DL_Grant;

(5) an aggregation level of the DL_Grant in a UE-specific or common search space;

(6) a relative position, in the UE-specific or common search space, of a first control channel element of the DL_Grant in the UE-specific or common search space;

(7) a subframe number where the DL_Grant is located in the UE-specific or common search space; and (8) a system frame number where the DL_Grant is located in the UE-specific or common search space;

wherein the above information is information which may be contained in one virtual signaling group.

The abovementioned DL_Grant format comprises at least one of the downlink control information format (DCI format) 1, the DCI format1a, the DCI format1b, the DCI format1c, the DCI format1d, the DCI format2, the DCI format2a, the DCI format2b and the DCI format2c and versions after R10.

The antenna instruction information in the abovementioned DL_Grant comprises related information of the antenna port indication in the DL_Grants with at least one of the DCI format2b, the DCI format2c and versions after R10.

The new data indication information in the disable TB signaling in the abovementioned DL_Grant comprises related information of a new data indication (NDI) in the DL_Grant with at least one of the DCI format2b, the DCI format2c and versions after R10.

The abovementioned aggregation level of the DL_Grant in the UE-specific or common search space comprises at least one of the aggregation levels in the search space of the DL_Grant with at least one of the DCI format1, the DCI format1a, the DCI format1b, the DCI format1c, the DCI format1d, the DCI format2, the DCI format2a, the DCI format2b, the DCI format2c and versions after R10.

The subframe where the abovementioned DL_Grant is located in the UE-specific or common search space comprises at least one of the subframes where the DL_Grant with at least one of the DCI format1, the DCI format1a, the DCI format1b, the DCI format1c, the DCI format1d, the DCI format2, the DCI format2a, the DCI format2b, the DCI format2c and versions after R10 is located.

The virtual signaling parameter set in the abovementioned virtual signaling group comprises one or more virtual IDs and/or virtual scrambling indication information.

The abovementioned port offset signaling group comprises a plurality of port offset signalings. The method further comprises: the base station side notifying the user equipment side to be in a mode through a high-layer signaling, in the mode, a high-layer or physical layer port offset signaling needing to be used to indicate the number of offset ports relative to the offset port 7, the offset port 8, the offset port 9 or the offset port 10.

The abovementioned port offset signaling group comprises a plurality of port offset signalings. The method further comprises: the base station side first notifying the UE side to be in a mode through a physical layer signaling, in the mode, a high-layer or physical layer port offset signaling needing to be used to indicate the number of offset ports relative to the offset port 7, the offset port 8, the offset port 9 or the offset port 10.

The abovementioned port offset signaling group comprises a plurality of port offset signalings. The method further comprises: the base station side notifying the UE side to be in a mode through at least one of the following information, and in the mode, a port offset signaling needing to be used to indicate the number of offset ports relative to the offset port 7, the offset port 8, the offset port 9 or the offset port 10.

The information comprises:

(1) antenna indication information in a DL_Grant;

(2) new data indication information in a disable transport block (TB) signaling in the DL_Grant;

(3) scrambling indication information in the DL_Grant;

(4) an aggregation level of the DL_Grant in a UE-specific or common search space;

(5) a relative position, in the UE-specific or common search space, of a first control channel element of the DL_Grant in the UE-specific or common search space;

(6) a subframe number where the DL_Grant is located in the UE-specific or common search space;

(7) a system frame number where the DL_Grant is located in the UE-specific or common search space; and (8) UE-specific high layer signaling;

In the abovementioned content, using a port offset signaling to indicate the number of offset ports relative to the offset port 7, the offset port 8, the offset port 9 or the offset port 10 can be using a high layer signaling, a physical layer signal, or at least one of the following information:

(1) antenna indication information in the DL_Grant;

(2) new data indication information in a disable transport block (TB) signaling in the DL_Grant;

(3) scrambling indication information in the DL_Grant;

(4) an aggregation level of the DL_Grant in a UE-specific or common search space;

(5) a relative position, in the UE-specific or common search space, of a first control channel element of the DL_Grant in the UE-specific or common search space;

(6) a subframe number where the DL_Grant is located in the UE-specific or common search space; and (7) a system frame number where the DL_Grant is located in the UE-specific or common search space.

In the abovementioned content, indicating the number of offset ports relative to the offset port 7, the offset port 8, the offset port 9 or the offset port 10 can comprise indicating at least one value in $\{0,2,4,5,6,7\}$.

In the CoMP system or the R11 downlink multiple input multiple output (DL_MIMO) or uplink multiple input multiple output (UL_MIMO), considering that the orthogonality is ensured to minimize the interference, the quasi-orthogonality guarantees the interference randomization and increases the capacity of cell.

In order to understand the present document, in the following with combination of specific embodiments, the present document will be further illustrated. For the embodiments 12 to 16, wherein the number of offset ports of the offset port 7 may be a corresponding value or an index of the corresponding value, for example, the standard specifies that the offset value is a value in $\{0,4\}$, then it only needs to notify that 0 represents shifting by 0 port and 4 represents shifting by 4 ports, or directly notify its offset value, such as 0 or 4.

The First Embodiment

Figure 1:
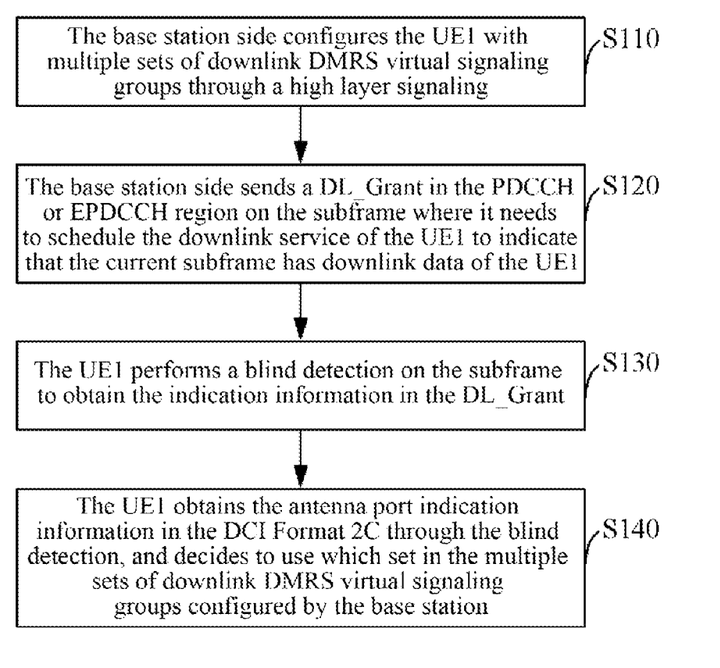
FIG. 1 is a schematic diagram of a flow chart in accordance with an embodiment of the present invention.

In the present embodiment, it assumes that UE1 is a user of R11. As shown in FIG. 1, the present embodiment comprises the following steps:

in step S110, the base station side configures the UE1 with multiple sets of downlink DMRS virtual signaling groups through a high layer signaling.

In step S120, the base station side sends a downlink grant signaling (DL_Grant) in the PDCCH or EPDCCH region on the subframe where it needs to schedule the downlink service of the UE1 to indicate that the current subframe has downlink data of the UE1.

In step S130, the UE1 performs a blind detection on the subframe to obtain the indication information in the DL_Grant.

In step S140, the UE1 obtains the antenna port indication information in the DCI Format 2C through the blind detection, and decides to use which set in the multiple sets of downlink DMRS virtual signaling groups configured by the base station.

For example:

when the UE1 obtains that the antenna port in the able TB and transmitting in one layer in the DL_Grant is port 7 and the scrambling sequence indication identity is $n_{SCID}=0$ in accordance with the blind detection, the first virtual signaling parameter set or virtual signaling group is selected;

when the UE1 obtains that the antenna port in the able TB and transmitting in one layer in the DL_Grant is port 8 and the scrambling sequence indication identity is $n_{SCID}=0$ in accordance with the blind detection, the second virtual signaling parameter set or virtual signaling group is selected;

when the UE1 obtains that the antenna port in the able TB and transmitting in one layer in the DL_Grant is port 7 and the scrambling sequence indication identity is $n_{SCID}=1$ in accordance with the blind detection, the third virtual signaling parameter set or virtual signaling group is selected;

when the UE1 obtains that the antenna port in the able TB and transmitting in one layer in the DL_Grant is port 8 and the scrambling sequence indication identity is $n_{SCID}=1$ in accordance with the blind detection, the fourth virtual signaling parameter set or virtual signaling group is selected.

The Second Embodiment

Assuming that UE1 is a user of R11, the base station side configures the UE1 with multiple sets of downlink DMRS virtual signaling groups through a high layer signaling, and then it sends the DL_Grant in the PDCCH or EPDCCH region on the subframe where it needs to schedule the downlink service of the UE1 to indicate that the current subframe has downlink data of the UE1. The UE1 performs a blind detection on the subframe to obtain the indication information in the DL_Grant.

Then the UE1 obtains new data indication information in the disable TB in the DCI Format 2C through the blind detection, and decides to use which set in the multiple sets of downlink DMRS virtual signaling groups configured by the base station.

For example:

when the UE1 obtains that the new data indication information in the disable TB and transmitting in one layer in the DL_Grant is NDI=0 in accordance with the blind detection, the first virtual signaling parameter set or virtual signaling group is selected;

when the UE1 obtains that the new data instruction information in the disable TB and transmitting in one layer in the DL_Grant is NDI=1 in accordance with the blind detection, the second virtual signaling parameter set or virtual signaling group is selected.

The Third Embodiment

Assuming that the UE1 is a user of R11, the base station side configures the UE1 with multiple sets of downlink DMRS virtual signaling groups through a high layer signaling, and then it sends the DL_Grant in the PDCCH or EPDCCH region on the subframe where it needs to schedule the downlink service of the UE1 to indicate that the current subframe has downlink data of the UE1. The UE1 performs a blind detection on the subframe to obtain the indication information in the DL_Grant.

Then, the UE1 obtains the new data indication information and antenna port indication information in the disable TB in the DCI Format 2C through the blind detection, and decides to use which set in the multiple sets of downlink DMRS virtual signaling groups configured by the base station.

For example:

when the UE1 obtains that the new data indication information in the disable TB and transmitting in one layer in the DL_Grant is NDI=0, and the antenna port in the able TB is port 7 in accordance with the blind detection, the first virtual signaling parameter set or virtual signaling group is selected;

when the UE1 obtains that the new data indication information in the disable TB and transmitting in one layer in the DL_Grant is NDI=0 and the antenna port in the able TB is port 8 in accordance with the blind detection, the second virtual signaling parameter set or virtual signaling group is selected;

when the UE1 obtains that the new data indication information in the disable TB and transmitting in one layer in the DL_Grant is NDI=1, and the antenna port in the able TB is port 7 in accordance with the blind detection, the third virtual signaling parameter set or virtual signaling group is selected;

when the UE1 obtains that the new data indication information in the disable TB and transmitting in one layer in the DL_Grant is NDI=1 and the antenna port in the able TB is port 8 in accordance with the blind detection, the fourth virtual signaling parameter set or virtual signaling group is selected.

The Fourth Embodiment

Assuming that UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then the UE1 obtains the new data indication information and scrambling sequence indication identity $n_{SCID}$ in the disable TB in the DCI Format 2C through the blind detection, and decides to use which set in the multiple sets of downlink DMRS virtual signaling groups configured by the base station.

For example:

when the UE1 obtains that the new data indication information in the disable TB and transmitting in one layer in the DL_Grant is NDI=0 and the able TB $n_{SCID}$=0 in accordance with the blind detection, the first virtual signaling parameter set or virtual signaling group is selected;

when the UE1 obtains that the new data indication information in the disable TB and transmitting in one layer in the DL_Grant is NDI=0 and the able TB $n_{SCID}$=1 in accordance with the blind detection, the second virtual signaling parameter set or virtual signaling group is selected;

when the UE1 obtains that the new data indication information in the disable TB and transmitting in one layer in the DL_Grant is NDI=1 and the able TB $n_{SCID}$=0 in accordance with the blind detection, the third virtual signaling parameter set or virtual signaling group is selected;

when the UE1 obtains that the new data indication information in the disable TB and transmitting in one layer in the DL_Grant is NDI=1 and the able TB $n_{SCID}$=1 in accordance with the blind detection, the fourth virtual signaling parameter set or virtual signaling group is selected.

The Fifth Embodiment

Assuming that UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the new data indication information, antenna port indication information and scrambling sequence indication identity $n_{SCID}$ in the disable TB in the DCI Format 2C through the blind detection, and decides to use which set in the multiple sets of downlink DMRS virtual signaling groups configured by the base station.

For example:

when the UE1 obtains that the new data instruction information in the disable TB and transmitting in one layer in the DL_Grant is NDI=0, the able TB $n_{SCID}$=0, and the antenna port of the able TB is port 7 according to the blind detection, the first virtual signaling parameter set or virtual signaling group is selected;

when the UE1 obtains that the new data instruction information in the disable TB and transmitting in one layer in the DL_Grant is NDI=0, the able TB $n_{SCID}$=1, and the antenna port of the able TB is port 7 according to the blind detection, the second virtual signaling parameter set or virtual signaling group is selected;

when the UE1 obtains that the new data instruction information in the disable TB and transmitting in one layer in the DL_Grant is NDI=1, the able TB $n_{SCID}$=0, and the antenna port of the able TB is port 8 according to the blind detection, the third virtual signaling parameter set or virtual signaling group is selected;

when the UE1 obtains that the new data instruction information in the disable TB and transmitting in one layer in the DL_Grant is NDI=1, the able TB $n_{SCID}$=1, and the antenna port of the able TB is port 8 according to the blind detection, the fourth virtual signaling parameter set or virtual signaling group is selected.

The Sixth Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the initial CCE position for placing the DL_Grant according to the blind detection, and decides to use which set in the multiple sets of downlink DMRS virtual signaling groups configured by the base station.

For example:

when the UE1 detects that the aggregation level of the DL_Grant is L=1 and the initial CCE position is nCCE, offset=0/2/4, or L=2 and nCCE, offset=0/4/8, or L=4 and nCCE, offset=0, or L=8 and nCCE, offset=0, the first virtual signaling parameter set or virtual signaling group is selected;

when the UE1 detects that the aggregation level of DL_Grant is L=1 and nCCE, offset=1/3/5, or L=2 and nCCE, offset=2/6/10, or L=4 and nCCE, offset=4, or L=8 and nCCE, offset=8, the second virtual signaling parameter set or virtual signaling group is selected.

The Seventh Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the initial CCE position for placing the DL_Grant and the aggregation level according to the blind detection, and decides to use which set in the multiple sets of downlink DMRS virtual signaling groups configured by the base station.

For example:

when the UE1 detects that the aggregation level of DL_Grant is L=1 and the initial CCE position is nCCE, offset=0/2/4, or L=2 and nCCE, offset=0/4/8, the first virtual signaling parameter set or virtual signaling group is selected;

when the UE1 detects that the aggregation level of DL_Grant is L=4 and the initial CCE position is nCCE, offset=0, or L=8 and nCCE, offset=0, the second virtual signaling parameter set or virtual signaling group is selected;

when the UE1 detects that the aggregation level of DL_Grant is L=1 and the initial CCE position is nCCE, offset=1/3/5, or L=2 and nCCE, offset=2/6/10, the third virtual signaling parameter set or virtual signaling group is selected;

when the UE1 detects that the aggregation level of DL_Grant is L=4 and the initial CCE position is nCCE, offset=4, or L=8 and nCCE, offset=8, the fourth virtual signaling parameter set or virtual signaling group is selected.

The Eighth Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then the UE1 obtains the initial CCE position for placing the DL_Grant and the scrambling sequence instruction identity $n_{SCID}$ according to the blind detection, and decides to use which set in the multiple sets of downlink DMRS virtual signaling groups configured by the base station.

For example:

when the UE1 detects that the aggregation level of the DL_Grant is L=1 and the initial CCE position is nCCE, offset=0/2/4, or L=2 and nCCE, offset=0/4/8, or L=4 and nCCE, offset=0, or L=8 and nCCE, offset=0, and the detected scrambling sequence instruction identity of the DL_Grant is $n_{SCID}$=0, the first virtual signaling parameter set or virtual signaling group is selected;

when the UE1 detects that the aggregation level of the DL_Grant is L=1 and the initial CCE position is nCCE, offset=1/3/5, or L=2 and nCCE, offset=2/6/10, or L=4 and nCCE, offset=4, or L=8 and nCCE, offset=8, and the detected scrambling sequence indication identity of the DL_Grant is $n_{SCID}$=0, the second virtual signaling parameter set or virtual signaling group is selected;

when the UE1 detects that the aggregation level of the DL_Grant is L=1 and the initial CCE position is nCCE, offset=0/2/4, or L=2 and nCCE, offset=0/4/8, or L=4 and nCCE, offset=0, or L=8 and nCCE, offset=0, and the detected scrambling sequence instruction identity of the DL_Grant is $n_{SCID}$=1, the third virtual signaling parameter set or virtual signaling group is selected;

when the UE1 detects that the aggregation level of the DL_Grant is L=1 and the initial CCE position is nCCE, offset=1/3/5, or L=2 and nCCE, offset=2/6/10, or L=4 and nCCE, offset=4, or L=8 and nCCE, offset=8, and the detected scrambling sequence instruction identity of the DL_Grant is $n_{SCID}$=1, the fourth virtual signaling parameter set or virtual signaling group is selected.

The Ninth Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then the UE1 obtains the initial CCE position for placing the DL_Grant, the aggregation level and the scrambling sequence instruction identity $n_{SCID}$ according to the blind detection, and decides to use which set in the multiple sets of downlink DMRS virtual signaling groups configured by the base station.

For example:

when the UE1 detects that the aggregation level of the DL_Grant is L=1 and the initial CCE position for placing the DL_Grant is nCCE, offset=0/2/4, or L=2 and nCCE, offset=0/4/8, and the detected scrambling sequence instruction identity of the DL_Grant is $n_{SCID}$=0, the first virtual signaling parameter set or virtual signaling group is selected;

when the UE1 detects that the aggregation level of the DL_Grant is L=4 and the initial CCE position for placing the DL_Grant is nCCE, offset=0, or L=8 and nCCE, offset=0, and the detected scrambling sequence indication identity of the DL_Grant is $n_{SCID}$=0, the second virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, and the detected scrambling sequence indication identity of the DL_Grant is $n_{SCID}$=0, the third virtual signaling parameter set or virtual signaling group is selected;

when the UE1 detects that the aggregation level of the DL_Grant is L=4 and the initial CCE position for placing the DL_Grant is nCCE, offset=4, or L=8 and nCCE, offset=8, and the detected scrambling sequence instruction identity of the DL_Grant is $n_{SCID}=0$, the fourth virtual signaling parameter set or virtual signaling group is selected;

when the UE1 detects that the aggregation level of the DL_Grant L=1 and the initial CCE position for placing the DL_Grant is nCCE, offset=0/2/4, or L=2 and nCCE, offset=0/4/8, and the detected scrambling sequence instruction identity of the DL_Grant $n_{SCID}=1$, the fifth virtual signaling parameter set or virtual signaling group is selected;

when the UE1 detects that the aggregation level of the DL_Grant is L=4 and the initial CCE position for placing the DL_Grant is nCCE, offset=0, or L=8 and nCCE, offset=0, and the detected scrambling sequence instruction identity of the DL_Grant is $n_{SCID}=1$, the sixth virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, and the detected scrambling sequence indication identity of the DL_Grant is $n_{SCID}=1$, the seventh virtual signaling parameter set or virtual signaling group is selected;

when the UE1 detects that the aggregation level of the DL_Grant is L=4 and the initial CCE position for placing the DL_Grant is nCCE, offset=4, or L=8 and nCCE, offset=8, and the detected scrambling sequence indication identity of the DL_Grant is $n_{SCID}=0$, the eighth virtual signaling parameter set or virtual signaling group is selected.

The Tenth Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then the UE1 obtains the initial CCE position for placing the DL_Grant and the new data indication information NDI in the disable TB signaling according to the blind detection, and decides to use which set in the multiple sets of downlink DMRS virtual signaling groups configured by the base station.

For example:

when the UE1 detects that the aggregation level of the DL_Grant is L=1 and the initial CCE position for placing the DL_Grant is nCCE, offset=0/2/4, or L=2 and nCCE, offset=0/4/8, or L=4 and nCCE, offset=0, or L=8 and nCCE, offset=0, and the detected new data indication information in the disable TB signaling of the DL_Grant is NDI=0, the first virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, or L=4 and nCCE, offset=4, or L=8 and nCCE, offset=8, and the detected new data indication information in the disable TB signaling of the DL_Grant is NDI=0, the second virtual signaling parameter set or virtual signaling group is selected;

when the UE1 detects that the aggregation level of the DL_Grant is L=1 and the initial CCE position for placing the DL_Grant is nCCE, offset=0/2/4, or L=2 and nCCE, offset=0/4/8, or L=4 and nCCE, offset=0, or L=8 and nCCE, offset=0, and the detected new data indication information in the disable TB signaling of the DL_Grant is NDI=1, the third virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, or L=4 and nCCE, offset=4, or L=8 and nCCE, offset=8, and the detected new data indication information in the disable TB signaling of the DL_Grant is NDI=1, the fourth virtual signaling parameter set or virtual signaling group is selected.

The Eleventh Embodiment

Assuming that the UE1 is a user of R11, the base station side configures the UE1 with multiple sets of downlink DMRS virtual signaling groups through a high layer signaling, then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the initial CCE position for placing the DL_Grant, the aggregation level, and the new data indication information NDI in the disable TB signaling according to the blind detection, and decides to use which set in the multiple sets of downlink DMRS virtual signaling groups configured by the base station.

For example:

when the UE1 detects that the aggregation level of the DL_Grant is L=1 and the initial CCE position for placing the DL_Grant is nCCE, offset=0/2/4, or L=2 and nCCE, offset=0/4/8, and the detected new data indication information in the disable TB signaling of the DL_Grant is NDI=0, the first virtual signaling parameter set or virtual signaling group is selected;

when the UE1 detects that the aggregation level of the DL_Grant is L=4 and the initial CCE position for placing the DL_Grant is nCCE, offset=0, or L=8 and nCCE, offset=0, and the detected scrambling sequence indication identity of the DL_Grant is $n_{SCID}=0$, the second virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, and the detected new data indication information in the disable TB signaling of the DL_Grant is NDI=0, the third virtual signaling parameter set or virtual signaling group is selected;

when the UE1 detects that the aggregation level of the DL_Grant is L=4 and the initial CCE position for placing the DL_Grant is nCCE, offset=4, or L=8 and nCCE, offset=8, and the detected new data indication information in the disable TB signaling of the DL_Grant is NDI=0, the fourth virtual signaling parameter set or virtual signaling group is selected;

when the UE1 detects that the aggregation level of the DL_Grant is L=1 and the initial CCE position for placing the DL_Grant is nCCE, offset=0/2/4, or L=2 and nCCE, offset=0/4/8, and the detected new data indication information in the disable TB signaling of the DL_Grant is NDI=1, the fifth virtual signaling parameter set or virtual signaling group is selected;

when the UE1 detects that the aggregation level of the DL_Grant is L=4 and the initial CCE position for placing the DL_Grant is nCCE, offset=0, or L=8 and nCCE, offset=0, and the detected new data indication information in the disable TB signaling of the DL_Grant is NDI=1, the sixth virtual signaling parameter set or virtual signaling group is selected;

when the UE1 detects that the aggregation level of the DL_Grant is L=1 and the initial CCE position for placing the DL_Grant is nCCE, offset=1/3/5, or L=2 and nCCE, offset=2/6/10, and the detected new data indication information in the disable TB signaling of the DL_Grant is NDI=1, the seventh virtual signaling parameter set or virtual signaling group is selected;

when the UE1 detects that the aggregation level of the DL_Grant is L=4 and the initial CCE position for placing the DL_Grant is nCCE, offset=4, or L=8 and nCCE, offset=8, and the detected new data indication information in the disable TB signaling of the DL_Grant is NDI=1, the eighth virtual signaling parameter set or virtual signaling group is selected.

The Twelfth Embodiment

Assuming that the UE1 is a user of R11, the base station side configures the UE1 to be in a certain working mode through a high layer signaling, or configures the UE1 to use the way of the orthogonal cover code (OCC) length being 4 to perform channel estimation on the DMRS, and the high layer configures the selection of a plurality of port offset values or the range of offset of the fixed port value in the standard, and then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the new data indication information in the disable TB in the DCI Format 2C through the blind detection, and decides to use the downlink DMRS port offset value configured by the base station.

For example:

when the UE1 obtains that the new data instruction information in the disable TB and transmitting in one layer in the DL_Grant according to the blind detection is NDI=0, the first downlink DMRS port offset value is selected;

when the UE1 obtains that the new data instruction information in the disable TB and transmitting in one layer in the DL_Grant according to the blind detection is NDI=1, the second downlink DMRS port offset value is selected.

Assuming that the configured second downlink DMRS port offset value is 4, then if the UE detects that the configured port is the port 7 in one layer for transmission in the DL_Grant, then the UE needs to use the way of OCC=4 on the port 7+4=11 to perform the channel estimation on DMRS.

If the cooperating ports are two ports, then the offset value of the port number of the first port is used to indicate the offset of the two ports.

The port offset value can be selected from a plurality of values configured by the high layer signaling, or selected from a plurality of given values in the standard.

The Thirteenth Embodiment

Assuming that the UE1 is a user of R11, the base station side configures the UE1 to be in a certain working mode through a high layer signaling, or configures the UE1 to use the way of the orthogonal cover code (OCC) length being 4 to perform channel estimation on the DMRS, and then it sends the DL_Grant in the PDCCH or EPDCCH region on the subframe where it needs to schedule the downlink service of the UE1 to indicate that the current sub frame has downlink data of the UE1, and the UE1 performs a blind detection on the subframe to obtain the indication information in the DL_Grant.

Then the UE1 obtains the initial CCE position for placing the DL_Grant according to the blind detection, to decide using the downlink DMRS port offset value configured by the base station and/or the OCC length used when the UE1 detects the DMRS.

For example:

when the UE1 detects that the aggregation level of the DL_Grant is L=1 and the initial CCE position for placing the DL_Grant is nCCE, offset=0/2/4, or L=2 and nCCE, offset=0/4/8, or L=4 and nCCE, offset=0, or L=8 and nCCE, offset=0, the first downlink DMRS port offset value and/or the OCC length used when the UE1 detects the DMRS is selected;

when the UE1 detects that the aggregation level of the DL_Grant is L=1 and the initial CCE position for placing the DL_Grant is nCCE, offset=1/3/5, or L=2 and nCCE, offset=2/6/10, or L=4 and nCCE, offset=4, or L=8 and nCCE, offset=8, the second downlink DMRS port offset value and/or the OCC length used when the UE1 detects the DMRS is selected.

Assuming that the configured offset is 4, then if the UE detects that the configured port is the port 7 in one layer for transmission in the DL_Grant, then the UE needs to use the way of OCC=4 on the port 7+4=11 to perform a channel estimation on the DMRS.

If the cooperating ports are two ports, then the offset of the two ports is performed according to the port number of the first port.

The port offset value can be selected from a plurality of values configured by the high layer signaling, or selected from a plurality of given values in the standard.

The Fourteenth Embodiment

Assuming that the UE1 is a user of R11, the base station side configures the UE1 to be in a certain working mode through a high layer signaling, or configures the UE1 to use the way of the orthogonal cover code (OCC) length being 4 to perform the channel estimation on the DMRS, and then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then the UE1 obtains the initial CCE position for placing the DL_Grant and the aggregation level according to the blind detection, and decides to use the downlink DMRS port offset value configured by the base station and/or the OCC length used when the UE1 detects the DMRS.

For example:

when the UE1 detects that the aggregation level of the DL_Grant is L=1 and the initial CCE position for placing the DL_Grant is nCCE, offset=0/2/4, or L=2 and nCCE, offset=0/4/8, the first downlink DMRS port offset value and/or the OCC length used when the UE1 detects the DMRS is selected;

when the UE1 detects that the aggregation level of the DL_Grant is L=4 and the initial CCE position for placing the DL_Grant is nCCE, offset=0, or L=8 and nCCE, offset=0, the second downlink DMRS port offset value and/or the OCC length used when the UE1 detects the DMRS is selected;

when the UE1 detects that the aggregation level of the DL_Grant is L=1 and the initial CCE position for placing the DL_Grant is nCCE, offset=1/3/5, or L=2 and nCCE, offset=2/6/10, the third downlink DMRS port offset value and/or the OCC length used when the UE1 detects the DMRS is selected;

when the UE1 detects that the aggregation level of the DL_Grant is L=4 and the initial CCE position for placing the DL_Grant is nCCE, offset=4, or L=8 and nCCE, offset=8, the fourth downlink DMRS port offset value and/or the OCC length used when the UE1 detects the DMRS is selected;

assuming that the configured offset is 4, then if the UE detects that the configured port is the port 7 in one layer for transmission in the DL_Grant, then the UE needs to use the way of OCC=4 on the port 7+4=11 to perform a channel estimation on the DMRS.

If the cooperating ports are two ports, then the offset of the two ports is performed according to the port number of the first port.

The port offset value can be selected from a plurality of values configured by the high layer signaling, or selected from a plurality of given values in the standard.

The Fifteenth Embodiment

Assuming that the UE1 is a user of R11, the base station side configures the UE1 to be in a certain working mode through a high layer signaling, or configures the UE1 to use the way of the orthogonal cover code (OCC) length being 4 to perform a channel estimation on the DMRS, and then it sends the DL_Grant in the PDCCH or EPDCCH region on the subframe where it needs to schedule the downlink service of the UE1 to indicate that the current subframe has downlink data of the UE1, and the UE1 performs a blind detection on the subframe to obtain the indication information in the DL_Grant.

Then, the UE1 obtains the initial CCE position for placing the DL_Grant and the new data indication information in the disable TB signaling according to the blind detection, and decides to use the downlink DMRS port offset value configured by the base station and/or the OCC length used when the UE1 detects the DMRS.

For example:

when the UE1 detects that the aggregation level of the DL_Grant is L=1 and the initial CCE position for placing the DL_Grant is nCCE, offset=0/2/4, or L=2 and nCCE, offset=0/4/8, or L=4 and nCCE, offset=0, or L=8 and nCCE, offset=0, and the detected new data indication information in the disable TB signaling of the DL_Grant is NDI=0, the first downlink DMRS port offset value and/or the OCC length used when the UE1 detects the DMRS is selected;

when the UE1 detects that the aggregation level of the DL_Grant is L=1 and the initial CCE position for placing the DL_Grant is nCCE, offset=1/3/5, or L=2 and nCCE, offset=2/6/10, or L=4 and nCCE, offset=4, or L=8 and nCCE, offset=8, and the detected new data indication information in the disable TB signaling of the DL_Grant is NDI=0, the second downlink DMRS port offset value and/or the OCC length used when the UE1 detects the DMRS is selected;

when the UE1 detects that the aggregation level of the DL_Grant is L=1 and the initial CCE position for placing the DL_Grant is nCCE, offset=0/2/4, or L=2 and nCCE, offset=0/4/8, or L=4 and nCCE, offset=0, or L=8 and nCCE, offset=0, and the detected new data indication information in the disable TB signaling of the DL_Grant is NDI=1, the third downlink DMRS port offset value and/or the OCC length used when the UE1 detects the DMRS is selected;

when the UE1 detects that the aggregation level of the DL_Grant is L=1 and the initial CCE position for placing the DL_Grant is nCCE, offset=1/3/5, or L=2 and nCCE, offset=2/6/10, or L=4 and nCCE, offset=4, or L=8 and nCCE, offset=8, and the detected new data indication information in the disable TB signaling of the DL_Grant is NDI=1, the fourth downlink DMRS port offset value and/or the OCC length used when the UE1 detects the DMRS is selected.

Assuming that the configured offset is 4, then if the UE detects that the configured port is the port 7 in one layer for transmission in the DL_Grant, then the UE needs to use the way of OCC=4 on the port 7+4=11 to perform a channel estimation on the DMRS.

If the cooperating ports are two ports, then the offset of the two ports is performed according to the port number of the first port.

The port offset value can be selected from a plurality of values configured by the high layer signaling, or selected from a plurality of given values in the standard.

The Sixteenth Embodiment

Assuming that the UE1 is a user of the R11, the base station side configures the UE1 to be in a certain working mode through a high layer signaling, or configures the UE1 to use the way of the OCC length being 4 to perform a channel estimation on the DMRS, and the base station side adds N bits (N>0) in the high layer signaling or the physical layer signaling to indicate the port offset value and/or the OCC length used when the UE1 detects the DMRS, used for the channel estimation at the UE side.

Assuming that the configured offset is 4, then if the UE detects that the configured port is the port 7 in one layer for transmission in the DL_Grant, then the UE needs to use the way of OCC=4 on the port 7+4=11 to perform a channel estimation on the DMRS.

If the cooperating ports are two ports, then the offset of the two ports is performed according to the port number of the first port.

The port offset value can be selected from a plurality of values configured by the high layer signaling, or selected from a plurality of given values in the standard.

The Seventeenth Embodiment

Assuming that the UE1 is a user of the R11, the base station side configures the UE1 to be in a certain working mode through a high layer signaling, or configure the UE1 to use the way of the OCC length being 4 to perform a channel estimation on the DMRS, and the base station side adds N bits (N>0) in the high layer signaling or the physical layer signaling to indicate the port offset value and/or the OCC length used when the UE1 detects the DMRS, used for the channel estimation at the UE side, wherein the value of N is shown in Table 3.

Assuming that the configured offset is 11, then if the UE detects in the DL_Grant that the configured port is the port 7 in one layer for transmission, the UE needs to use the way of OCC=4 on the port 11 to perform a channel estimation on the DMRS.

TABLE 3

Correspondence between port offset
indication bits and port numbers

| Indication bit (N) | Port Number |
| --- | --- |
| 00 | 7 |
| 01 | 8 |
| 10 | 11 |
| 11 | 13 |

The port offset value can be selected from a plurality of values configured by the high layer signaling, or selected from a plurality of given values in the standard.

The Eighteenth Embodiment

Assuming that the UE1 is a user of the R11, the base station side configures the UE1 to be in a certain working mode through a high layer signaling, or configure the UE1 to use the way of the OCC length being 4 to perform a channel estimation on the DMRS, and the base station side adds N bits (N>0) in the high layer signaling or the physical layer signaling to indicate the port offset value and/or the OCC length used when the UE1 detects the DMRS, used for the channel estimation at the UE side, wherein the value of N is shown in Table 4.

Assuming that the configured offset is 100, then if the UE detects in the DL_Grant that the configured port is the port 7 in one layer for transmission, then the UE needs to use the way of OCC=4 on the port 11 to perform a channel estimation on the DMRS.

If the cooperating ports are two ports, then the offset of the two ports is performed according to the port number of the first port.

TABLE 4

Correspondence between port offset indication
bits and port numbers

| Indication bit (N) | Port Number |
| --- | --- |
| 000 | 7 or 9, OCC length = 2 |
| 001 | 8 or 10, OCC length = 2 |
| 010 | 7 or 9, OCC length = 4 |
| 011 | 8 or 10, OCC length = 4 |
| 100 | 11 or 12, OCC length = 4 |
| 101 | 13 or 14, OCC length = 4 |
| 110 | 9, OCC length = 2 |
| 111 | 10, OCC length = 2 |

The port offset value can be selected from a plurality of values configured by the high layer signaling, or selected from a plurality of given values in the standard.

The Nineteenth Embodiment

Assuming that the UE1 is a user of R11, the base station side configures the UE1 to be in a certain working mode through a high layer signaling, and notifies the port to map a offset value through a high layer signaling, wherein for this offset value, a direct value can be used for notifying or a range is pre-defined and a value index in the range is used for notifying or the way of table index is used for notifying.

Assuming that the configured offset notified by the base station side with a table is 100, then if the UE detects in the DL_Grant that the configured port is the port 7 in one layer for transmission, and then the UE needs to use the way of OCC=4 on the port 11 to perform a channel estimation on the DMRS.

The port offset value can be selected from a plurality of values configured by the high layer signaling, or selected from a plurality of given values in the standard.

The method for receiving downlink demodulation pilot control signaling provided in the present document mainly comprises:

performing a blind detection on at least one of the following information to obtain indication information in a downlink grant control information (DL_Grant):

the UE-specific or common high layer signaling;

the antenna indication information of the downlink grant control information (DL_Grant);

the new data indication information in a disable transport block (TB) signaling in the DL_Grant;

the scrambling indication information in the DL_Grant;

the aggregation level of the DL_Grant in a UE-specific or common search space;

the relative position, in the UE-specific or common search space, of a first control channel element of the DL_Grant in the UE-specific or common search space;

the subframe number where the DL_Grant is located in the UE-specific or common search space; and the system frame number where the DL_Grant is located in the UE-specific or common search space;

and obtaining the index of the virtual signaling group and/or index of port offset signaling group used when the base station side generates the downlink pilot sequence and/or maps the generated downlink pilot sequence according to the indication information in the DL_Grant obtained through the blind detection.

The base station according to the embodiment of the present invention mainly comprises a generating and mapping module and a notifying module, wherein:

the generating and mapping module is configured to generate a downlink pilot sequence and/or map the generated downlink pilot sequence;

the notifying module is configured to notify the user equipment (UE) side of the index of the virtual signaling group and/or index of port offset signaling group used when the base station side generates the downlink pilot sequence and/or maps the generated downlink pilot sequence through at least one of the following information:

(1) the UE-specific or common high layer signaling notifies multiple sets of virtual signaling groups;

(2) the antenna indication information of the downlink grant control information (DL_Grant);

(3) the new data indication information in a disable transport block (TB) signaling in the DL_Grant;

(4) the scrambling indication information in the DL_Grant;

(5) the aggregation level of the DL_Grant in a UE-specific or common search space;

(6) the relative position, in the UE-specific or common search space, of a first control channel element of the Physical downlink control channel or DL_Grant in the UE-specific or common search space;

(7) the subframe number where the DL_Grant is located in the UE-specific or common search space; and (8) the system frame number where the DL_Grant is located in the UE-specific or common search space;

The user equipment according to the embodiment of the present invention mainly comprises a detecting module and a selecting module, wherein:

the detecting module is configured to perform a blind detection on at least one of the following information to obtain the indication information in the downlink grant control information (DL_Grant):

the UE-specific or common high layer signaling;

the antenna indication information of the downlink grant control information (DL_Grant);

the new data indication information in the disable transport block (TB) signaling in the DL_Grant;

the scrambling indication information in the DL_Grant;

the aggregation level of the DL_Grant in a UE-specific or common search space;

the relative position, in the UE-specific or common search space, of a first control channel element of the DL_Grant in the UE-specific or common search space;

the subframe number where the DL_Grant is located in the UE-specific or common search space; and the system frame number where the DL_Grant is located in the UE-specific or common search space;

the selecting module is configured to obtain the index of the virtual signaling group and/or index of port offset signaling group used when the base station generates a downlink pilot sequence and/or maps the generated downlink pilot sequence according to the indication information in the DL_Grant obtained by the detecting module.

Those skilled in the art should understand that respective components of the device and/or system provided in the abovementioned embodiments of the present invention, as well as the respective steps in the method, can be implemented with general-purpose computing devices, and they can be integrated in a single computing device, or distributed in a network composed of a plurality of computing devices, alternatively, they can be implemented with program codes executable by the computing devices, so that they can be stored in storing devices and executed by the computing devices, or they are made into individual integrated circuit modules respectively, or several modules or steps of them are made into a single integrated circuit module for implementation. Thus, the present document is not limited to any specific combination of hardware and software.

Although the embodiments of the present invention are disclosed above, the content is only to facilitate understanding the embodiments of the present invention, and is not intended to limit the present document. For a person skilled in the technical field to which the present document belongs, various modifications and changes can be made in forms and details in the implementation on the premise of without departing from the spirit and scope disclosed in the present document, but the patent protection scope of the present document still needs to be subject to the scope defined as the appended claims.

INDUSTRIAL APPLICABILITY

The present document provides the method for indicating pilot control signaling to make better use of the pilot to achieve the effects of orthogonality and interference randomization, and enhance the accuracy of channel estimation and increase the capacity of system.

What is claimed is:

1. A method for notifying downlink demodulation pilot control signaling, comprising:

a base station side notifying a user equipment (UE) of an index of a virtual signaling group or index of a port offset signaling group used when the base station side generates a downlink pilot sequence or maps the generated downlink pilot sequence through at least one of following information:

a UE-specific or common high layer signaling;

antenna indication information of a downlink grant control information (DL_Grant);

new data indication information in a disable transport block (TB) signaling in the DL_Grant;

scrambling indication information in the DL_Grant;

an aggregation level of the DL_Grant in a UE-specific or common search space;

a relative position, in the UE-specific or common search space, of a first control channel element of the DL_Grant in the UE-specific or common search space;

a subframe number where the DL_Grant is located in the UE-specific or common search space; and a system frame number where the DL_Grant is located in the UE-specific or common search space; wherein:

a virtual signaling parameter set in the virtual signaling group comprises one or more virtual identities (ID) or virtual scrambling indication information.

2. The method of claim 1, wherein the DL_Grant format comprises:

at least one of downlink control information format (DCI format) 1, DCI format1a, DCI format1b, DCI format1c, DCI format1d, DCI format2, DCI format2a, DCI format2b, DCI format2c and versions after R10.

3. The method of claim 1, wherein the antenna indication information in the DL_Grant comprises:

related information of antenna port indication in the DL_Grant with at least one of DCI format2b, DCI format2c and versions after R10.

4. The method of claim 1, wherein the new data indication information in the disable TB signaling in the DL_Grant comprises:

related information of new data indication (NDI) in the DL_Grant with at least one of DCI format2b, DCI format2c and versions after R10.

5. The method of claim 1, wherein the aggregation level of the DL_Grant in the UE-specific or common search space comprises:

at least one of aggregation levels in a search space of the DL_Grant with at least one of downlink control information format (DCI format) 1, DCI format1a, DCI format1b, DCI format1c, DCI format1d, DCI format2, DCI format2a, DCI format2b, DCI format2c and versions after R10.

6. The method of claim 1, wherein a subframe where the DL_Grant is located in the UE-specific or common search space comprises:

at least one of subframes where the DL_Grant with at least one of downlink control information format (DCI format) 1, DCI format1a, DCI format1b, DCI format1c, DCI format1d, DCI format2, DCI format2a, DCI format2b, DCI format2c and versions after R10 is located.

7. The method of claim 1, wherein:

the port offset signaling group comprises a plurality of port offset signalings;

the method further comprises: the base station side notifying the UE side to be in a certain mode through a high layer signaling, and in the mode, a high layer or physical layer port offset signaling needing to be used to indicate the number of offset ports relative to offset port 7 or offset port 8 or offset port 9 or offset port 10.

8. The method of claim 7, wherein the method for using a port offset signaling to indicate the number of offset ports relative to the offset port 7 or the offset port 8 or the offset port 9 or the offset port 10 comprises:
   using a high-layer signaling, or a physical layer signaling, or at least one of following information:
   the antenna indication information of the DL_Grant;
   the new data indication information in the disable TB signaling in the DL_Grant;
   the scrambling indication information in the DL_Grant;
   the aggregation level of the DL_Grant in the UE-specific or common search space;
   the relative position, in the UE-specific or common search space, of the first control channel element of the DL_Grant in the UE-specific or common search space;
   the subframe number where the DL_Grant is located in the UE-specific or common search space; and
   the system frame number where the DL_Grant is located in the UE-specific or common search space.

9. The method of claim 8, wherein indicating the number of offset ports relative to the offset port 7 or the offset port 8 or the offset port 9 or the offset port 10 comprises indicating at least one value in {0, 2, 4, 5, 6, 7}.

10. The method of claim 1, wherein:
   the port offset signaling group comprises a plurality of port offset signalings;
   the method further comprises: the base station side first notifying the UE side to be in a mode through a physical layer signaling, and in the mode, a high-layer or physical-layer port offset signaling needing to be used to indicate the number of offset ports relative to offset port 7 or offset port 8 or offset port 9 or offset port 10.

11. The method of claim 10, wherein the method for using a port offset signaling to indicate the number of offset ports relative to the offset port 7 or the offset port 8 or the offset port 9 or the offset port 10 comprises:
   using a high-layer signaling, or a physical layer signaling, or at least one of following information:
   the antenna indication information of the DL_Grant;
   the new data indication information in the disable TB signaling in the DL_Grant;
   the scrambling indication information in the DL_Grant;
   the aggregation level of the DL_Grant in the UE-specific or common search space;
   the relative position, in the UE-specific or common search space, of the first control channel element of the DL_Grant in the UE-specific or common search space;
   the subframe number where the DL_Grant is located in the UE-specific or common search space; and
   the system frame number where the DL_Grant is located in the UE-specific or common search space.

12. The method of claim 1, wherein:
   the port offset signaling group comprises a plurality of port offset signalings;
   the method further comprises: the base station side first notifying the UE side to be in a mode through at least one of following information, and in the mode, the port offset signaling needing to be used to indicate the number of offset ports relative to offset port 7 or offset port 8 or offset port 9 or offset port 10:
   the antenna indication information of DL_Grant;
   the new data indication information in the disable TB signaling in the DL_Grant;
   the scrambling indication information in the DL_Grant;
   the aggregation level of the DL_Grant in the UE-specific or common search space;
   the relative position, in the UE-specific or common search space, of the first control channel element of the DL_Grant in the UE-specific or common search space;
   the subframe number where the DL_Grant is located in the UE-specific or common search space;
   the system frame number where the DL_Grant is located in the UE-specific or common search space; and
   the UE-specific high layer signaling.

13. The method of claim 12, wherein the method for using a port offset signaling to indicate the number of offset ports relative to the offset port 7 or the offset port 8 or the offset port 9 or the offset port 10 comprises:
   using a high-layer signaling, or a physical layer signaling, or at least one of following information:
   the antenna indication information of the DL_Grant;
   the new data indication information in the disable TB signaling in the DL_Grant;
   the scrambling indication information in the DL_Grant;
   the aggregation level of the DL_Grant in the UE-specific or common search space;
   the relative position, in the UE-specific or common search space, of the first control channel element of the DL_Grant in the UE-specific or common search space;
   the subframe number where the DL_Grant is located in the UE-specific or common search space; and
   the system frame number where the DL_Grant is located in the UE-specific or common search space.

14. A method for receiving downlink demodulation pilot control signaling, comprising:
   receiving a notification from a base station side that notifying an index of a virtual signaling group or index of a port offset signaling group used when the base station side generates a downlink pilot sequence or maps the generated downlink pilot sequence;
   performing a blind detection on at least one of following information, and obtaining indication information in a downlink grant control information (DL_Grant):
   a UE-specific or common high layer signaling;
   antenna indication information of the DL_Grant;
   new data indication information in a disable transport block (TB) signaling in the DL_Grant;
   scrambling indication information in the DL_Grant;
   an aggregation level of the DL_Grant in a UE-specific or common search space;
   a relative position, in the UE-specific or common search space, of a first control channel element of the DL_Grant in the UE-specific or common search space;
   a subframe number where the DL_Grant is located in the UE-specific or common search space; and
   a system frame number where the DL_Grant is located in the UE-specific or common search space;
   and
   obtaining an index of a virtual signaling group or index of a port offset signaling group used when the base station side generates a downlink pilot sequence or maps the generated downlink pilot sequence according to indication information in a DL_Grant obtained through the blind detection; wherein,
   a virtual signaling parameter set in the virtual signaling group comprises one or more virtual identities (ID) or virtual scrambling indication information.

15. The method for receiving downlink demodulation pilot control signaling according to claim 14, wherein the DL_Grant format comprises:
   at least one of downlink control information format (DCI format) 1, DCI format1a, DCI format1b, DCI format1c, DCI format1d, DCI format2, DCI format2a, DCI format2b, DCI format2c and versions after R10.

16. A base station, comprising hardware performing instructions stored in a non-transitory computer readable medium which executes steps in following modules: a generating and mapping module and a notifying module, wherein:
the generating and mapping module is configured to generate a downlink pilot sequence and/or map a generated downlink pilot sequence;
the notifying module is configured to notify the user equipment (UE) side of the index of a virtual signaling group or index of port offset signaling group used when the base station side generates a downlink pilot sequence or maps a generated downlink pilot sequence through at least one of following information:
a UE-specific or common high layer signaling;
antenna indication information of a downlink grant control information (DL_Grant);
new data indication information in a disable transport block (TB) signaling in the DL_Grant;
scrambling indication information in the DL_Grant;
an aggregation level of the DL_Grant in a UE-specific or common search space;
a relative position, in the UE-specific or common search space, of a first control channel element of the DL_Grant in the UE-specific or common search space;
a subframe number where the DL_Grant is located in the UE-specific or common search space; and
a system frame number where the DL_Grant is located in the UE-specific or common search space; wherein,
a virtual signaling parameter set in the virtual signaling group comprises one or more virtual identities (ID) or virtual scrambling indication information.

17. The base station according to claim 16, wherein the DL_Grant format comprises:
at least one of downlink control information format (DCI format) 1, DCI format1a, DCI format1b, DCI format1c, DCI format1d, DCI format2, DCI format2a, DCI format2b, DCI format2c and versions after R10.

18. A user equipment, comprising hardware performing instructions stored in a non-transitory computer readable medium which executes steps in following modules: a detecting module and a selecting module, wherein:
the detecting module is configured to receive a notification from a base station side that notifying an index of a virtual signaling group or index of a port offset signaling group used when the base station side generates a downlink pilot sequence or maps the generated downlink pilot sequence, and obtain indication information in a downlink grant control information (DL_Grant) by performing a blind detection on at least one of following information:
a UE-specific or common high layer signaling;
antenna indication information of DL_Grant;
new data indication information in a disable transport block (TB) signaling in the DL_Grant;
scrambling indication information in the DL_Grant;
an aggregation level of the DL_Grant in a UE-specific or common search space;
a relative position, in the UE-specific or common search space, of a first control channel element of the DL_Grant in the UE-specific or common search space;
a subframe number where the DL_Grant is located in the UE-specific or common search space; and
a system frame number where the DL_Grant is located in the UE-specific or common search space;
the selecting module is configured to obtain an index of a virtual signaling group or index of a port offset signaling group used when the base station side generates a downlink pilot sequence or maps a generated downlink pilot sequence according to the indication information in the DL_Grant obtained by the detecting module; wherein,
a virtual signaling parameter set in the virtual signaling group comprises one or more virtual identities (ID) or virtual scrambling indication information.

19. The user equipment according to claim 18, wherein the DL_Grant format comprises:
at least one of downlink control information format (DCI format) 1, DCI format1a, DCI format1b, DCI format1c, DCI format1d, DCI format2, DCI format2a, DCI format2b, DCI format2c and versions after R10.

* * * * *